United States Patent [19]
Kimmelman

[11] Patent Number: 5,031,335
[45] Date of Patent: Jul. 16, 1991

[54] LAWN MOWER MEASURING INSTRUMENT

[76] Inventor: David B. Kimmelman, 13505 E. U.S. 223, Riga, Mich. 49276

[21] Appl. No.: 586,882

[22] Filed: Sep. 24, 1990

[51] Int. Cl.$^5$ ............................................. G01D 21/00
[52] U.S. Cl. ........................................ 33/628; 33/633;
       33/655; 33/613; 33/833
[58] Field of Search ................. 33/626, 628, 633, 635,
       33/613, 655, 832, 833, 836, 203.11; 56/249

[56] References Cited
U.S. PATENT DOCUMENTS
1,928,528  9/1933  Gagnon ............................ 33/836 X
4,594,785  6/1986  Carlson .............................. 33/833

Primary Examiner—Harry N. Haroian
Attorney, Agent, or Firm—Marshall & Melhorn

[57] ABSTRACT

An apparatus for precision measurements of the clearance between the blades of a lawn mower and the ground. The apparatus includes a groomer gage and bed knife gage mounted on a plate and adapted to be positioned against the rollers of a mower during the taking of measurements. The plate, when positioned against the rollers simulates the position of the ground. The gages on the plate are positioned on the plate in a manner allowing the respective shafts of the groomer gage and bed knife gage to contact the groomer member and bed knife, respectively. The distance the respective shafts are displaced to cause contact with the groomer member and the bed knife corresponds to the ground clearance of the groomer member and the bed knife, respectively. The respective distances corresponding to the ground clearance of the groomer member and the bed knife are displayed by the groomer gage and the bed knife gage, respectively. The simultaneous measurement of the ground clearance of the groomer member and the bed knife facilitates the adjustment of the mower necessary to achieve the desired cutting height.

11 Claims, 2 Drawing Sheets

LAWN MOWER MEASURING INSTRUMENT

BACKGROUND OF THE INVENTION

The present invention relates generally to a lawn mower measuring instrument and, in particular, to an apparatus for measuring the clearance between the blades of a lawn mower and the ground.

It is critical in the maintenance of golf courses and in particular the surface of the grass of the putting greens that a particular grass height is maintained. The rate of growth of the grass is dependent upon the season, the amount of rainfall, the ambient temperature, and the amount of sunshine. Under certain climatic conditions, it may be desirable to maintain the height of the grass at various lengths to assure maximum health to the grass. Hot dry conditions may require that the grass be maintained at a height greater than under moist cool conditions. In various geographical regions of the country the weather conditions change rather drastically In order to maintain the grass at different heights for the different weather conditions the mowing equipment must be readily adjustable to achieve the desired grass height necessary to assure the proper groomed condition.

In order to adjust the mowing equipment, the ground clearance of several of the working parts, particularly the groomer members and the bed knife must be accurately adjusted to assure the proper cutting level.

Numerous devices and instruments have been devised for the measuring of machine parts. Some of these instruments or devices have even been capable of selectively measuring the ground clearance of single machine parts. However, known devices have not been capable of simultaneously measuring the ground clearance of multiple parts of a mower.

U.S. Pat. No. 4,813,152 discloses a clearance gauge for setting a tool above a work piece comprising a simple lever-actuated dial gauge which is supported above a work piece by a base block. The gauge is calibrated by measuring a clearance of known dimension. Thereafter, the clearance can be easily re-established repeatedly without any additional adjustment to the associated dial indicator.

U.S. Pat. No 4,704,802 discloses a tooth profile sensing instrument capable of sensing the profile of teeth of a corrugation roll and comprises a carriage or sled which has a pair of runners or slide elements for supporting an axially movable stem The stem engages the upper surface of a tooth and is adapted to move along the tooth to sense the profile.

U.S. Pat. No. 4,577,412 discloses a rheometer rotor height gauge for facilitating adjustment of the height of rotors of rheometers in relation to dies of the rheometer.

U.S Pat. No. 3,382,582 discloses a gauge for measuring squareness of a finished surface in respect to a reference surface and also measuring the flatness or straightness of the finished surface. More specifically, the invention utilizes an indicator, the movement of which is toward and away from the reference plane, to provide an accurate reading of a finished work piece.

U.S. Pat. No. 3,017,702 discloses a tire tread safety gauge for use in accurately determining the safety-factor and useful mileage remaining in tires of various types. The invention utilizes an indicator to measure the remaining tread thickness. A tire safety valued is then determined from the thread thickness upon comparison with a proper scale corresponding to the type of tire being measured.

U.S. Pat. No. 968,884 discloses an indicating surface gage for determining whether the inner portion of the bore is of the same diameter as the outer portion.

SUMMARY OF THE INVENTION

The present invention concerns an apparatus for simultaneously effecting precision measurements of multiple machine parts. More specifically, the apparatus of the invention is designed primarily for the purpose of simultaneously measuring the ground clearance of the groomer member and the bed knife of mowing equipment used in maintaining golf courses and more specifically the putting surfaces of such courses.

The apparatus includes a groomer gage and bed knife gage mounted on a plate in a spaced apart relationship. Each gage contains a shaft connected to a dial indicator. The plate simulates the position of the ground when placed against the front and rear rollers of a mower. When the plate is positioned against the rollers, the spaced apart positioning of the groomer gage and the bed knife gage allows the distal end of the shafts of the groomer gage and bed knife gage to contact the groomer member and bed knife, respectively. The distances the respective shafts are displaced by contact with the groomer member and the bed knife is displayed by the dial indicators of groomer gage and the bed knife gage, respectively. The respective displayed values of distance correspond to the ground clearance of the groomer member and the bed knife. The simultaneous measurement of the ground clearance of the groomer member and the bed knife facilitates the adjustment of the mower necessary to achieve the desired cutting height.

Additionally, the shafts of the gages may be provided with a spring means to urge the respective shafts into contact with the groomer member and the bed knife.

An object of the invention is to provide an instrument capable of simultaneously measuring the ground clearance of the groomer member and the bed knife.

Another object of the invention is to provide an instrument for simultaneous measurement of multiple machine parts which is relatively small and light weight and can be readily transported or moved from one machine to another.

Other objects and advantages of this invention reside in the construction of parts, the combination thereof and the mode of operation, as will become more apparent from the description of the preferred embodiment.

BRIEF DESCRIPTION OF THE DRAWINGS

The above, as well as other advantages of the present invention will become readily apparent to those skilled in the art from reading the following detailed description of a preferred embodiment when considered in the light of the accompanying drawings, in which.

DESCRIPTION OF THE PREFERRED EMBODIMENT

Figure 1:
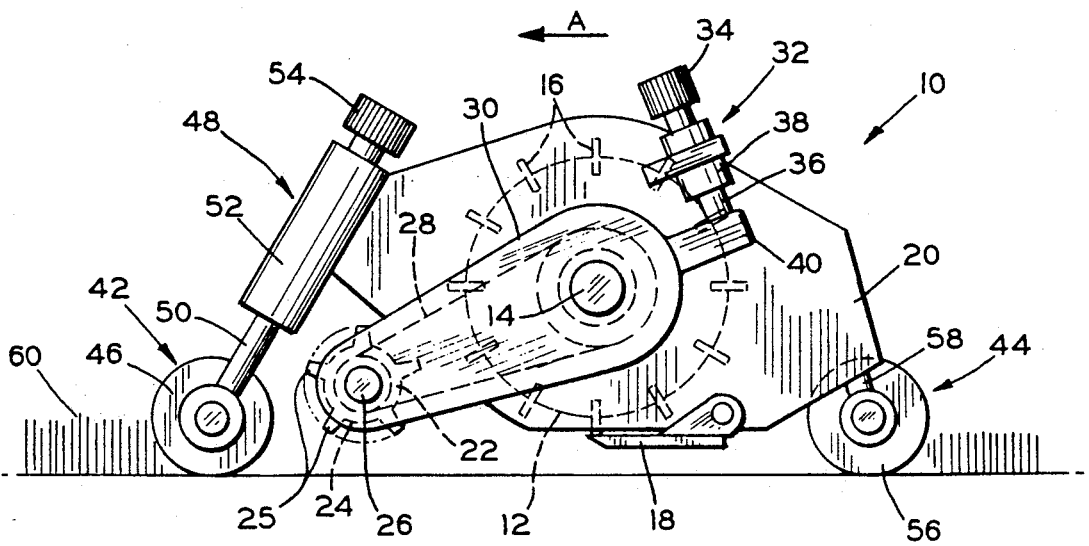
FIG. 1 is a schematic fragmentary side elevational view of a mower with which ground clearance measurements may be determined by the apparatus of the present invention.

Referring to the drawings and particularly to FIG. 1, there is illustrated a mower generally indicated by reference numeral 10 The mower 10 includes a main cutting reel 12 mounted to rotate about the axis of a rotatably mounted shaft 14. The cutting reel 12 includes a plurality of cutting blades 16 adapted to achieve a cutting action with an associated bed knife 18 adjustably mounted to a mower frame 20.

A groomer member 22, typically comprised of a plurality of blades 24 having radially extending teeth 25, is mounted to rotate about the axis of a shaft 26 rotatably mounted to a housing 30 pivotally mounted to the shaft 14. The shaft 26 and the shaft 14 are drivingly interconnected by a belt 28 and associated pulleys (shown in dashed lines) suitably mounted on the shafts 14 and 26. It will be understood that pivotal movement of the housing 30 about shaft 14 will cause simultaneous movement of the groomer member 22 and the associated shaft 26.

Integral with the mower frame 20 is a lead screw device 32 for effectuating pivotal movement of the housing 30. The lead screw device 32 has an adjustment knob 34, an externally threaded shaft 36, and a cylindrical frame member 38 having an internally threaded bore to receive the shaft 36. It will be understood that the housing 30 can be rotated about the shaft 14 of the main cutting reel 12 by turning the knob 34 in a clockwise or counterclockwise direction. The associated shaft 36 is effective to cause the desired pivotal movement of the housing 30 by contacting a flange 40 extending from the housing 30. By causing the shaft 36 to move downwardly, the housing 30 may be rotated in a clockwise direction effecting simultaneous upward movement of the groomer member 22. The groomer member 22 can be lowered by turning the knob 34 in an opposite direction.

The mower frame 20 is supported for ground engagement by a front roller assembly 42 and a trailing rear roller assembly 44. The front roller assembly 42 includes a ground engaging roller 46 a lead screw device 48. The lead screw device 48 includes an externally threaded shaft 50, a cylindrical frame member 52 having an internally threaded bore to receive the shaft 50, and an associated adjustment knob 54. The roller 46 is rotatably secured to a distal end of the shaft 50 which may be adjusted relative to the cylindrical frame member 52 by the knob 54. It will be understood that the roller 46 can be moved toward or away from the cylindrical frame member 52 by turning the knob 54 in a clockwise or counterclockwise direction.

The rear roller assembly 44 includes a ground engaging trailing roller 56 secured to the distal end of a shaft 58 fixedly attached to the frame 20.

The cutting reel 12 and the groomer member 22 may be driven by a prime mover such as a gasoline engine, for example (not shown).

A handle assembly (not shown) attached to the frame 20, allows a mower user to urge the mower 10 forward in order to effect the desired cutting of the grass 60. The prime mover rotates the shaft 14 effectuating the movement of the belt 28 resulting in the rotation of shaft 26.

The rotation of shafts 14 and 26 causes rotation of the cutting reel 12 and the groomer member 22, respectively. The rotation of the groomer member 22 causes the teeth 25 to impinge upon the grass 60 forcing the individual blades of the grass 60 to assume or approximate a vertical position. The blades 16 of the cutting reel 12 cooperate with the bed knife 18 to shear the erect grass 60 as the entire mower assembly 10 moves in the direction of arrow A as shown in FIG. 1. The rotation of the cutting reel 12 causes the blades 16 to strike the erect grass 60, thereby, moving the grass 60 into contact with the bed knife 18 to effectively shear the grass 60.

The mower 10 is particularly useful in cutting the grass 60 typically employed in the putting greens of a golf course. It is critical in the maintenance of golf courses, and in particular the surface of the putting greens, that the grass 60 of the greens be maintained at a predetermined height. Typically the height of the grass 60 of the greens ranges from ⅛ to ⅜ inch while the fairway grass ranges from ½ to ¾ inch.

The rate of growth of the grass 60 may be dependent upon the particular part of the season the amount of rainfall, the ambient temperature and the amount of sunshine. Accordingly the mowing equipment must be readily adjustable to achieve the desired groomed condition.

In setting the mower 10 for the correct ground clearance, the first step involves the adjustment of the height of the mower 10 relative to the ground. The frame 20 and the associated bed knife 18 may be raised or lowered with respect to the ground, by turning the knob 54 of the front roller assembly 42 in a clockwise or counterclockwise direction.

To adjust the height of the groomer member 22 relative to the ground, the knob 34 may be turned in a clockwise or counterclockwise direction Thereby, the shaft 36 can be moved relative to the cylindrical frame member 38. Once the shaft 36 is adjusted to cause the distal end thereof to contact the flange 40 of the housing 30, the movement of the flange 40 is effective to cause pivotal movement of the housing 30 about the shaft 14 and simultaneous movement of the groomer member 22 and the associated shaft 26.

Figure 2:
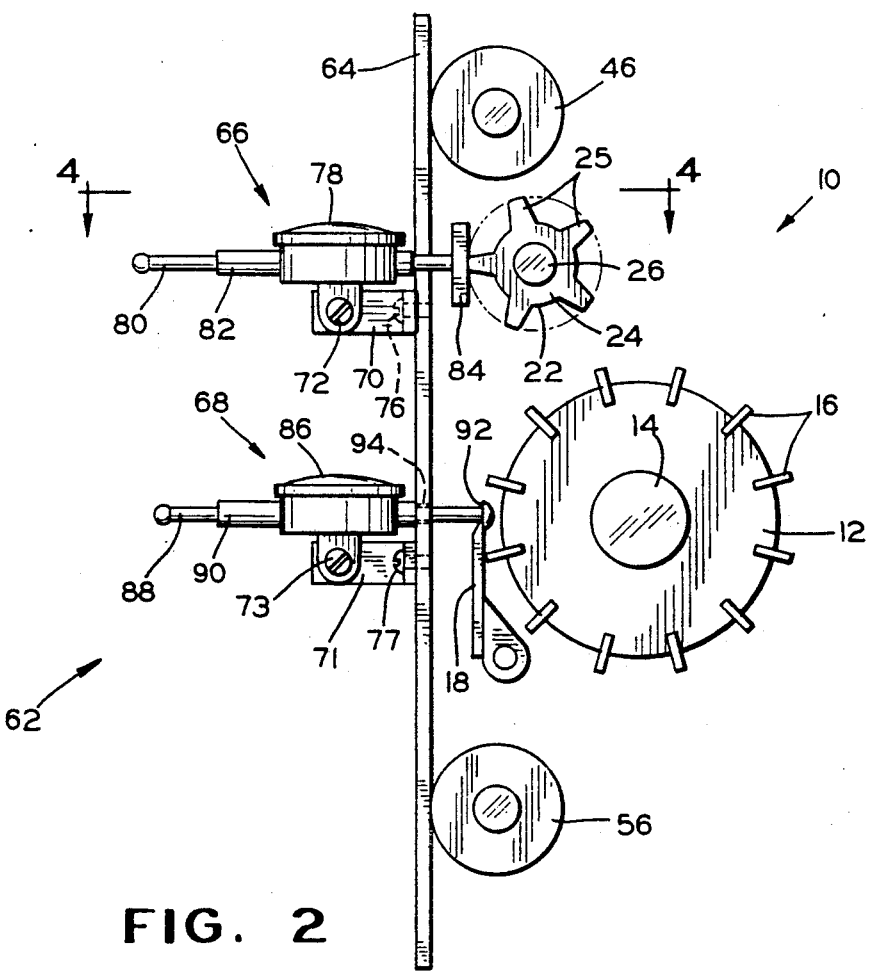
FIG. 2 is side elevational view of a measuring apparatus embodying the features of the present invention in association with certain of the elements of the mower illustrated in FIG. 1.
Figure 3:
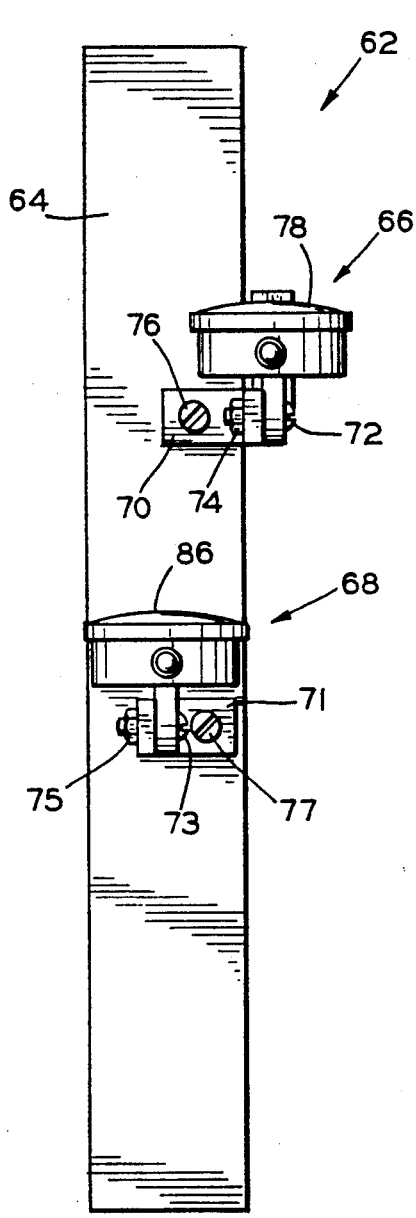
FIG. 3 is a top plan view of the measuring apparatus shown in FIG. 2.
Figure 4:
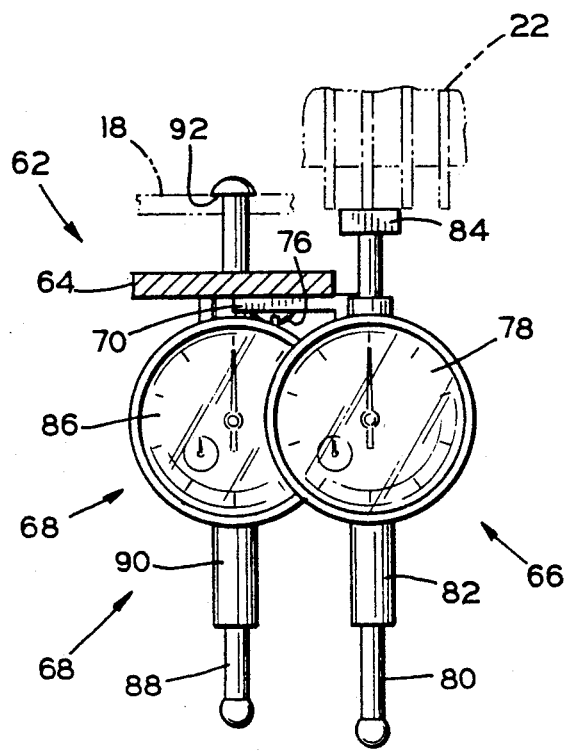
FIG. 4 is an enlarged sectional view of the apparatus illustrated in FIG. 2 taken along line 4—4 thereof.

A measuring instrument embodying the features of the present invention, generally indicated by reference numeral 62, is illustrated in FIGS. 2, 3, and 4. The instrument 62 includes a plate 64 adapted to be placed against the leading and trailing rollers 46 and 56 respectively, of the mower 10 illustrated in FIG. 1, for example. A groomer gage 66 and a bed knife gage 68 are mounted in spaced apart relation on the plate 64 by any suitable means such as angle brackets 70 and 71, for example. The groomer gage 66 and the bed knife gage 68 are attached to the brackets 70 and 71, respectively, by suitable fastener means such as threaded fasteners 72 and 73, respectively The threaded fasteners 72 and 73 are conventionally provided with nuts 74 and 75, respectively The brackets 70 and 71 are in turn mounted on the plate 64 by suitable means such as threaded fasteners 76 and 77 extending through the other one of the legs of each of the respective brackets 70 and 71. The fasteners 76 and 77 may be threaded into openings in the plate 64, or may be provided with nuts in the conventional manner. The groomer gage 66 and the bed knife gage 68 are preferably laterally offset from one another along the plate 64 so that the groomer gage and the bed knife gage may be simultaneously observed.

The groomer gage 66 includes a dial indicator 78, a shaft 80 and a cylindrical housing 82. The dial indicator 78 is operatively connected to the shaft 80 which axially extends through the cylindrical housing 82. A feeler member 84 in the form of a rectangular plate is located at a distal end of the shaft 80 for contact with the teeth 25 of the groomer member 22.

The feeler member 84 is of sufficient length to effect the desired measurement in other mowers wherein the spacing between the groomer member and the associated bed knives vary.

Spring means are typically disposed within the cylindrical housing 82 to maintain the shaft 80 at a normally retracted rest position. The shaft 80 can be displaced by the user to cause the feeler member 84 to engage the teeth 25 by manually urging a distal end of the shaft 80. The dial indicator 78 will then visually indicate the distance the shaft 80 is axially displaced from the normal or rest position.

The groomer gage 66 is positioned on the plate 64 so that the associated shaft 80 is disposed for travel adjacent an edge of the plate 64.

The bed knife gage 68 includes a dial indicator 86, a shaft 88, and a cylindrical housing 90. The dial indicator 86 is operatively connected to the shaft 88 which axially extends through the cylindrical housing 90. A distal end of the shaft 88 is provided with a shoulder 92 for engagement with the bed knife 18. The undersurface of the shoulder 92 is capable of engaging the upper surface of the bed knife 18.

Spring means are typically disposed within the cylindrical housing 90 to maintain the shaft 88 at a normally retracted rest position within the cylindrical housing 90. The shaft 88 can be axially displaced by the user to cause the shoulder 92 to engage the bed knife 18 by manually urging a distal end of the shaft 88 The dial indicator 86 will then visually indicate the distance the shaft 88 is displaced from the normal or rest position to bring the shoulder 92 into engagement with the bed knife 18.

The bed knife gage 68 is positioned on the plate 64 in alignment with an aperture 94 to allow for axial movement of the shaft 88 therethrough.

In the measurement of the ground clearance of the mower 10, the plate 64 of instrument 62 is placed for simultaneous contact with the leading and trailing rollers 46 and 56, respectively, as illustrated in FIGS. 2 and 3. The plate 64, when positioned against the rollers 46 and 56 simulates the position of the ground The instrument is then moved laterally until the groomer gage 66 and the bed knife gage 68 are in position for measurement. The shaft 88 of the bed knife gage 68 is manually urged past the bed knife 18. The user moves the instrument 62 laterally until the shaft 88 contacts the leading edge of the bed knife 18 and then releases the shaft 88. The spring means retracts the shaft 88 until the undersurface of the shoulder 92 engages the upper surface of the leading edge of the bed knife 18. The distance the shaft 88 is displaced from the initial resting position within the cylindrical housing 90 and the final position of engagement with the bed knife 18 corresponds to the ground clearance of the bed knife 18 and is displayed on the dial indicator 86.

Similarly the instrument user urges the shaft 80 of the groomer gage 66 toward the teeth 25 of the groomer member 22 until the feeler member 84 of shaft 80 contacts a tooth 25 of the groomer member 22 which is positioned perpendicular to the plane of the feeler member 84. The distance the shaft 80 is displaced corresponds to the ground clearance of the groomer member 22 and is displayed by the dial indicator 78.

After determining the distance of the bed knife 18 and the groomer member 22 from the plate 64, respectively, and thereby the positions of the bed knife 18 and the groomer member 22 relative to the ground, the positions of the bed knife 18 and the groomer member 22 relative to each other can be determined using the plate 64 as a position reference.

It should be understood that a suitable means of adjusting the spacing between the groomer gage 66 and the bed knife gage 68 can be provided such as a slot or a plurality of apertures within the plate for the insertion of the threaded fastener 76 into a variety of alternative positions within the plate 64. The alternative positions of the threaded fastener 76 allows the groomer gage 66 to be placed at various positions on the plate 64 at various distances from the bed knife gage 68 in order to measure the ground clearance of mowers 10 having different distances between the bed knife 18 and the groomer member 22.

Figure 5:
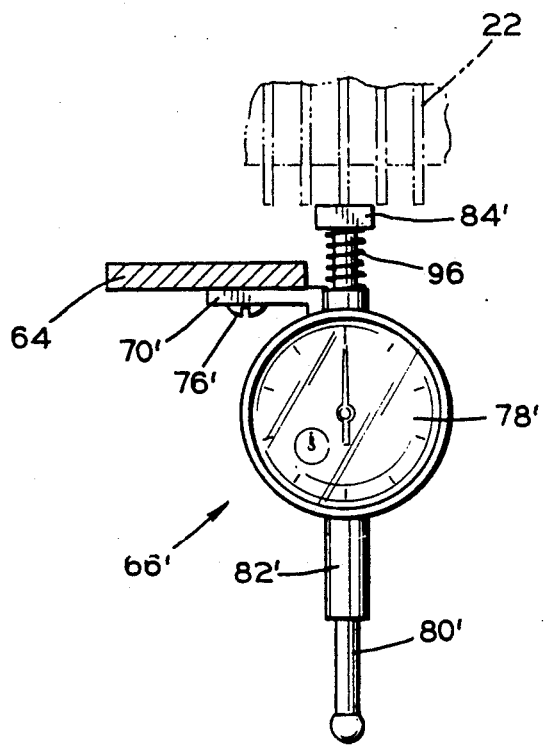
FIG. 5 is an enlarged sectional view of an alternative embodiment of a groomer gage.

Alternatively, the instrument 62 can be provided with means normally urging the shaft 80 and the feeler member 84 to an external position. FIG. 5 illustrates such an alternative embodiment with elements similar to those shown in FIGS. 1, 2, 3 and 4 designated with prime reference numerals. As shown in FIG. 5, a groomer gage 66' includes a dial indicator 78', a shaft 80', a cylindrical housing 82' and a feeler member 84'. A suitable urging means such as a helical compression spring 96 encircles the shaft 80' to urge the feeler member 84' into a normally extended position so as to engage the teeth 25 of the groomer member 22 in position for measurement. The necessity for the manual manipulation for the shaft 80' in the measurement of the ground clearance of the groomer member 22 is thus eliminated.

In the maintenance of golf courses and in particular the surface of the grass of the putting greens it is critical that a particular grass height be maintained. An experienced grounds keeper can determine the necessary height to trim the grass depending on the geographical location of the course and the current or expected weather conditions. A well equipped grounds keeper uses a mower having not only a cutting reel and an associated bed knife, but a groomer member as well. The groomer member assures that each blade of grass is sheared at an equal length since the groomer causes each blade of grass to stand erect prior to cutting. The groomer member must be positioned at a sufficient height above the ground such that it will not impede the movement of the mower and, at the same time, be positioned low enough to impinge upon the grass. The bed knife is positioned at the cutting height determined by the user. The present invention provides an apparatus capable of measuring the position of the groomer member relative to the ground and relative to the bed knife, thereby facilitating the positioning of the groomer member and bed knife. The above attributes make the apparatus of the present invention invaluable to a grounds keeper.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for facilitating the adjustment of the position of a mower including a bed knife and a groomer member relative to a planar reference surface representing a grass surface to be trimmed, and for adjusting the positions of the bed knife and the groomer member relative to one another, comprising:

a supporting means including a planar surface;

first position indicating means mounted on said supporting means for indicating the distance of the bed knife of the mower from the planar surface of said supporting means; and second position indicating means mounted on said supporting means for indicating the distance of the groomer member of the mower from the planar surface of said supporting means, whereby the distances of the bed knife and of the groomer member relative to the planar surface of said supporting means and relative to each other are visually indicated for enabling the determination of the distance from the grass surface to the bed knife and groomer member in order to set the mower for the desired cutting height of the grass surface.

2. The apparatus as defined in claim 1, wherein said first position indicating means comprises:

a shaft mounted for axial movement normal to the planar surface of said supporting means, one end of said shaft being provided with a shoulder adapted to engage the bed knife;

a housing containing said shaft and through which said shaft is axially slidable; and a dial indicator means attached to said housing for indicating the axial position of said shaft relative to said housing.

3. The apparatus as defined in claim 1, wherein said second position indicating means comprises:

a shaft mounted for axial movement normal to the planar surface of said supporting means;

a feeler member attached to one end of said shaft adapted to contact the groomer member;

a housing containing said shaft and through which said shaft is axially slidable, and a dial indicator means attached to said housing for indicating the axial position of said shaft relative to said housing.

4. The apparatus as defined in claim 3, wherein said feeler member has an extended contact surface.

5. The apparatus as defined in claim 1 including threaded fastener means for mounting said first and second position indicating means on said supporting means.

6. The apparatus as defined in claim 3 including means for urging the shaft of said second measuring means relative to said housing.

7. The apparatus as defined in claim 6, wherein said means for urging comprises a spring.

8. The apparatus as defined in claim 1 including means for effecting relative spacing between said first and second indicating means.

9. The apparatus as defined in claim 8 wherein said means for effecting relative spacing includes slot means formed in said supporting means.

10. The apparatus as defined in claim 8 wherein said means for effecting relative spacing includes a plurality of spaced openings formed in said supporting means.

11. An apparatus for facilitating the adjustment of the position of a mower including a bed knife and groomer member relative to a planar reference surface representing the grass surface to be trimmed and for adjusting the positions of the bed knife and the groomer member relative to one another comprising:

(A) a supporting means including a planar surface;

(B) first position indicating means mounted on said supporting means for indicating the distance of the bed knife of the mower from the planar surface of said supporting means, said first position indicating means comprising:

(i) a shaft mounted for axial movement normal to the planar surface of said supporting means, one end of said shaft provided with a shoulder adapted to engage the bed knife;

(ii) a housing containing said shaft and through which said shaft is axially slidable; and (iii) a dial indicator means attached to said housing for indicating the axial position of said shaft relative to said housing; and (C) second position indicating means mounted on said supporting means for indicating the distance of the groomer member of the mower from the planar surface of said supporting means, whereby the distances of the bed knife and of the groomer member relative to the planar surface of said supporting means and relative to each other are visually indicated for enabling the determination of the distance from the grass surface to the bed knife and groomer member in order to set the mower for the desired cutting height of the grass surface said second position indicating means comprising:

(i) a shaft mounted for axial movement normal to the planar surface of said supporting means;

(ii) a feeler member attached to one end of said shaft adapted to contact the groomer member;

(iii) a housing containing said shaft and through which said shaft is axially slidable; and (iv) a dial indicator means attached to said housing for indicating the axial position of said shaft relative to said housing.

* * * * *